(12) United States Patent
Song (10) Patent No.: US 12,190,880 B2
(45) Date of Patent: Jan. 7, 2025

(54) METHOD AND APPARATUS FOR MULTI-PARTY DIALOGUE DISCOURSE PARSING AS A SEQUENCE GENERATION

(71) Applicant: TENCENT AMERICA LLC, Palo Alto, CA (US)

(72) Inventor: Linfeng Song, Bellevue, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 309 days.

(21) Appl. No.: 17/900,134

(22) Filed: Aug. 31, 2022

(65) Prior Publication Data
US 2024/0071381 A1    Feb. 29, 2024

(51) Int. Cl.
*G10L 15/22*    (2006.01)
*G10L 15/06*    (2013.01)
*G10L 15/18*    (2013.01)

(52) U.S. Cl.
CPC ............ *G10L 15/22* (2013.01); *G10L 15/063* (2013.01); *G10L 15/18* (2013.01); *G10L 2015/227* (2013.01)

(58) Field of Classification Search
CPC ....... G10L 15/22; G10L 15/063; G10L 15/18; G10L 2015/227
See application file for complete search history.

(56) References Cited

U.S. PATENT DOCUMENTS

| | | |
|---|---|---|
| 7,379,870 B1 | 5/2008 | Belvin et al. |
| 2020/0265195 A1 | 8/2020 | Galitsky |
| 2022/0269868 A1 | 8/2022 | Song |

OTHER PUBLICATIONS

Shi and Huang, A Deep Sequential Model for Discourse Parsing on Multi-Party Dialogues, 2019, AAAI Conference, whole document (Year: 2019).*
Kawano, Dialogue Structure Parsing on Multi-Floor Dialogue Based on Multi-Task Learning, 2020, IJCAI, whole document (Year: 2020).*
Ho, Multi-tasking Dialogue Comprehension with Discourse Parsing, 2021, arXiv, whole document (Year: 2021).*
Liu, Improving Multi-Party Dialogue Discourse Parsing via Domain Integration, 2021, arXiv, 2021 (Year: 2021).*

(Continued)

*Primary Examiner* — Sonia L Gay
(74) *Attorney, Agent, or Firm* — Sughrue Mion, PLLC (57) ABSTRACT

A method performed by at least one processor includes retrieving a dialogue history including a plurality of speech utterances, each speech utterance including one or more words. The method further includes encoding the plurality of speech utterances such that each speech utterance is associated with a sequence identifier indicating an order of each speech utterance in the dialogue history. The method further includes decoding the encoded plurality of speech utterances to generate at least one discourse relation triple corresponding to the dialogue history, the at least one discourse relation triple including a first sequence identifier of a first speech utterance from the plurality of speech utterances, a second sequence identifier of a second speech utterance from the plurality of speech utterances, and a dialogue discourse type.

20 Claims, 7 Drawing Sheets

(56) References Cited

OTHER PUBLICATIONS

Jiaao Chen et al., "Structure-Aware Abstractive Conversation Summarization via Discourse and Action Graphs", Apr. 16, 2021 Retrieved from the Internet: https://arxiv.org/pdf/2104.08400.pdf (12 pages total).

Xinyuan Zhou et al., "Multi-Encoder-Decoder Transformer for Code-Switching Speech Recognition", Jun. 18, 2020, Retrieved from the Internet: https://arxiv.org/pdf/2006.10414.pdf (5 pages total).

Hirofumi Inaguma et al., "Alignment Knowledge Distillation for Online Streaming Attention-based Speech Recognition", Aug. 22, 2021, Retrieved from the Internet: https://arxiv.org/pdf/2103.00422.pdf (15 pages total).

International Search Report issued Jun. 16, 2023 in International Application No. PCT/US2023/016028.

Written Opinion issued Jun. 16, 2023 in International Application No. PCT/US2023/016028.

\* cited by examiner

| Model | Pretrained LM | #Param. | Molweni Link | Molweni Link&Rel | STAC Link | STAC Link&Rel |
|---|---|---|---|---|---|---|
| DeepSequential (Shi and Huang, 2019) | None | 3M | 76.80 | 54.03 | 71.58 | 53.77 |
| Hierarchical GRU (Liu and Chen, 2021) | Roberta-base | 132M | 79.70 | 55.90 | 73.30 | 56.90 |
| Structure Self-Aware (Wang et al., 2021) | ELECTRA-small | 14M | 81.63 | 58.54 | 73.48 | 57.31 |
| Classifier-Hier | T5-small Enc. | 36M | 78.79 | 56.51 | 71.73 | 55.19 |
| | T5-base Enc. | 112M | 80.26 | 57.44 | 72.00 | 55.69 |
| | T5-large Enc. | 344M | 80.10 | 57.71 | 71.24 | 55.85 |
| Classifier-Concat | T5-small Enc. | 35M | 78.80 | 55.99 | 71.05 | 52.16 |
| | T5-base Enc. | 109M | 80.04 | 57.44 | 72.37 | 56.02 |
| | T5-large Enc. | 341M | 82.73 | 58.95 | 74.65 | 57.36 |
| D²PSG-LT | T5-small | 77M | 79.05 | 55.91 | 72.08 | 55.49 |
| | T5-base | 247M | 80.51 | 57.31 | 75.07 | 59.29 |
| | T5-large | 783M | 86.08 | 61.74 | 77.61 | 61.49 |
| D²PSG-FH | T5-small | 77M | 77.53 | 54.03 | 70.10 | 51.22 |
| | T5-base | 247M | 80.29 | 54.95 | 72.22 | 55.23 |
| | T5-large | 783M | 84.16 | 59.34 | 75.91 | 60.16 |

Table I

METHOD AND APPARATUS FOR MULTI-PARTY DIALOGUE DISCOURSE PARSING AS A SEQUENCE GENERATION

TECHNICAL FIELD

The present disclosure relates generally to multi-party dialogue discourse, and more particularly to methods and apparatuses for multi-party dialogue discourse as a sequence generation.

BACKGROUND

Conversational discourse analysis aims to extract the interactions between dialogue turns, which is crucial for modeling complex multi-party dialogues. As the benchmarks are still limited in size and human annotations are costly, the current standard approaches apply pre-trained language models, but still require randomly initialized classifiers to make predictions. These classifiers require massive amounts of data to work smoothly with the pre-trained encoder, causing a severe data hunger issue.

Recent years have witnessed a surge of interest in modeling dialogues that usually involve two or more speakers. For multi-party dialogues, the task of dialogue discourse parsing has been proposed to discover the intercorrelation in each pair of dialogue utterances (e.g., turns). Dialogue discourse parsing is crucial because multiple speakers are involved, adding extra complexity to the dialogue flow. Recent research uses pre-trained language models (LMs) across various NLP tasks. However, pre-trained language models require massive amounts of data with little performance gain. Improvements are presented herein to alleviate these issues.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for multi-party dialogue discourse as a sequence generation.

According to an exemplary embodiment, a method performed by at least one processor includes retrieving a dialogue history including a plurality of speech utterances, each speech utterance including one or more words. The method further includes encoding the plurality of speech utterances such that each speech utterance is associated with a sequence identifier indicating an order of each speech utterance in the dialogue history. The method further includes decoding the encoded plurality of speech utterances to generate at least one discourse relation triple corresponding to the dialogue history, the at least one discourse relation triple including a first sequence identifier of a first speech utterance from the plurality of speech utterances, a second sequence identifier of a second speech utterance from the plurality of speech utterances, and a dialogue discourse type.

According to an exemplary embodiment, an apparatus includes at least one memory configured to store computer program code and at least one processor configured to access said at least one memory and operate as instructed by the computer program code. The computer program code includes retrieving code configured to cause the at least one processor to retrieve a dialogue history including a plurality of speech utterances, each speech utterance including one or more words. The computer program code further includes encoding code configured to cause the at least one processor to encode the plurality of speech utterances such that each speech utterance is associated with a sequence identifier indicating an order of each speech utterance in the dialogue history. The computer program code further includes decoding code configured to cause the at least one processor to decode the encoded plurality of speech utterances to generate at least one discourse relation triple corresponding to the dialogue history, the at least one discourse relation triple including a first sequence identifier of a first speech utterance from the plurality of speech utterances, a second sequence identifier of a second speech utterance from the plurality of speech utterances, and a dialogue discourse type.

According to an exemplary embodiment, a non-transitory computer readable medium having instructions stored therein, which when executed a processor cause the processor to execute a method including retrieving a dialogue history including a plurality of speech utterances, each speech utterance including one or more words. The method further includes encoding the plurality of speech utterances such that each speech utterance is associated with a sequence identifier indicating an order of each speech utterance in the dialogue history. The method further includes decoding the encoded plurality of speech utterances to generate at least one discourse relation triple corresponding to the dialogue history, the at least one discourse relation triple including a first sequence identifier of a first speech utterance from the plurality of speech utterances, a second sequence identifier of a second speech utterance from the plurality of speech utterances, and a dialogue discourse type.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Embodiments of the present disclosure are directed to strategies to formulate multi-party dialogue discourse parsing as a sequence generation ($D^2PSG$), where classifier decisions may be converted into a sequence of tokens. A pre-trained T5 model may be adopted to solve this task so that no parameters are randomly initialized. The embodiments of the present disclosure also leverage the descriptions of the discourse relations to help the model determine discourse relation types. Experiments on two popular benchmarks show that the embodiments of the present disclosure outperform previous state-of-the-art models by a large margin, where these embodiments are also more robust in zero-shot and few-shot settings.

Figure 1:
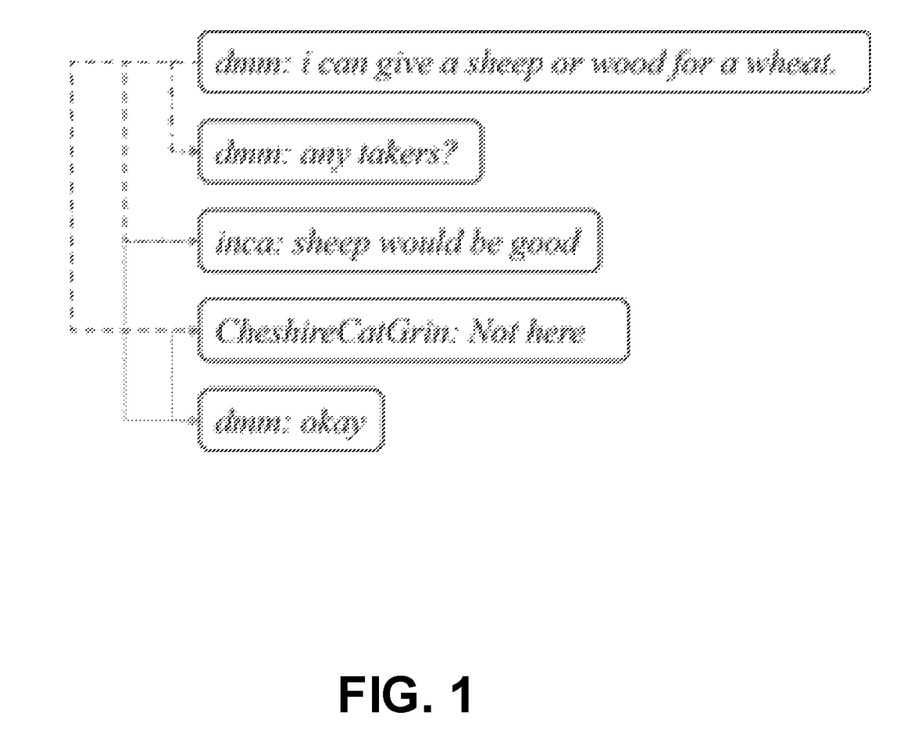
FIG. 1 is a diagram of an example multi-party dialogue, in accordance with various embodiments of the present disclosure.

FIG. 1 illustrates an example multi-party dialogue and the corresponding discourse structure. As an example, the dialogue includes three speakers (e.g., dmm, inca, Cheshire-CatGrin). The discourse structure represents the relations between non-adjacent utterances. The solid lines may represent a "Question-Answer Pair," the dash lines may represent a "Question Elaboration," and the dash dotted lines may represent an "Acknowledgement." For example, the first utterance (i.e., "i can give a sheep or wood for a wheat") and the fourth utterance (i.e., "Not here") represent a "Question-Answer Pair." Determining conversational discourse information has proven beneficial for various downstream tasks, such as dialogue response generation, summarization, and question answering.

In some embodiments, for each EDU (utterance) $x\_i$ in a sequence of EDUs $x\_1, x\_2, \ldots x\_N$ from a dialogue, a target EDU $x\_j$ is picked from all antecedent EDUs ($x\_(<i)$) of $x\_i$, and where a discourse type is decided for the target EDU. The prediction of each discourse relation ($x\_j$, $x\_i$, $r\_ji$) may be divided into a link prediction $P(x\_j \to x\_i | x\_0, x\_1, \ldots, x\_i)$ and a relation classification $P(r\_ji | x\_j \to x\_i)$.

In some embodiments, the task of determining a discourse relation is determined as a sequence generation problem so that a pre-trained encoder-decoder model may be directly applied without the need of adding any randomly initialized classifiers. The embodiments of the present disclosure include at least two effective strategies to linearize the classification decisions of dialogue discourse parsing into token sequences: Last Turn ($D^2PSG$-LT) and Full history ($D^2PSG$-FH).

According to some embodiments, a dialogue history is encoded with a sequence identifier (e.g., turn marker). For example, each utterance (e.g., the i-th) in a dialogue history may be associated with a sequence identifier (e.g., $T_i$) to indicate the position of the utterance in the dialogue history. Subsequently, an input dialogue $x_1, x_2, \ldots, x_N$ with N utterances may be converted into $T_1, x_1, T_2, x_2, \ldots T_N, x_N$. Since each $T_i$ is the sequence identifier for the corresponding utterance $x_i$, a discourse relation triple ($x_i, x_j, r_{i,j}$) with type $r_{i,j}$ may be serialized as ($T_i, T_j : r_{i,j}$).

Using a concatenated history of utterances as inputs, the first strategy casts the discourse-classification decisions of the latest turn (e.g., latest utterance), while the second strategy casts the decisions of all dialogue turns (e.g., utterances) in natural order. Referring to FIG. 1 as an example, each utterance may be associated with a sequence identifier (e.g., T0 ... TN) that identifies an order of each utterance as a turn. Referring to FIG. 1, each utterance may be associated with a sequence identifier as follows:

T0 dmm: i can give a sheep or wood for a wheat.
T1 dmm: any takers?
T2 inca: sheep would be good
T3 ChesireCatGrin: Not here
T4 dmm: okay Based on these sequence identifiers, the token sequences generated by the strategies may be "T4, T3: Acknowledgement" and "T1, T0: Question Elaboration;" "T2, T0: Question-answer pair;" "T3, T0: Question-answer pair;" "T4, T3: Acknowledgement," respectively. Comparing with the first strategy, the second one can leverage additional context, but with extra noise. The description of each relation type may be leveraged as extra inputs to help the model better understand the discourse relations.

Figure 2:
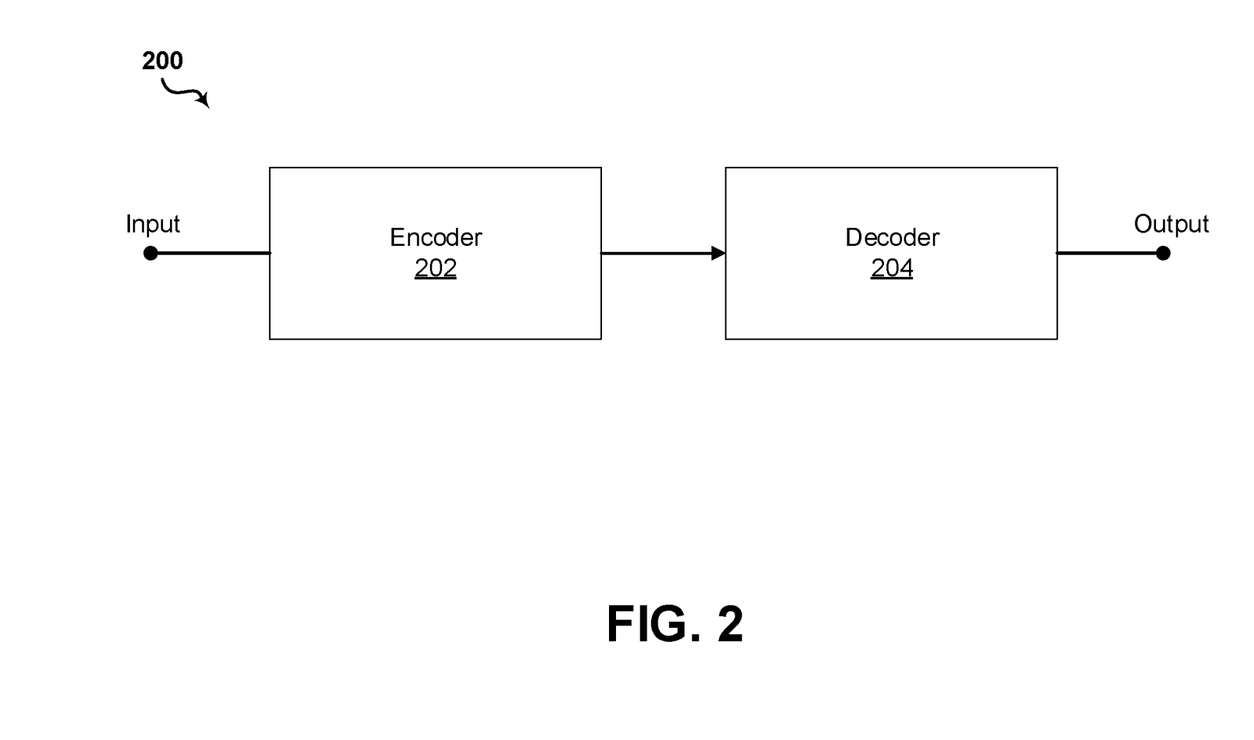
FIG. 2 is a block diagram of a dialogue discourse parsing as a sequence generation system, in accordance with various embodiments of the present disclosure.

According to some embodiments, a $D^2PSG$ system is implemented with a pre-trained T5 model with constrained decoding to generate legal sequences under the disclosed strategies. Different from most previous approaches that work in an offline manner, the $D^2PSG$ system analyzes each ongoing dialogue, making this system more broadly applicable than the previous approaches. FIG. 2 illustrates an example $D^2PSG$ system 200 that includes an encoder 202 and a decoder 204. The encoder 202 may be a T5 encoder, and the decoder 204 may be a T5 decoder. The encoder 202 may receive a dialogue history such as the dialogue history illustrated in FIG. 1, and output an encoded dialogue history that includes a sequence identifier associated with each utterance in the dialogue history. The decoder 204 may receive as input the encoded dialogue history as well as discourse relation types, and output at least one discourse relation triple associated with the dialogue history.

Figure 3:
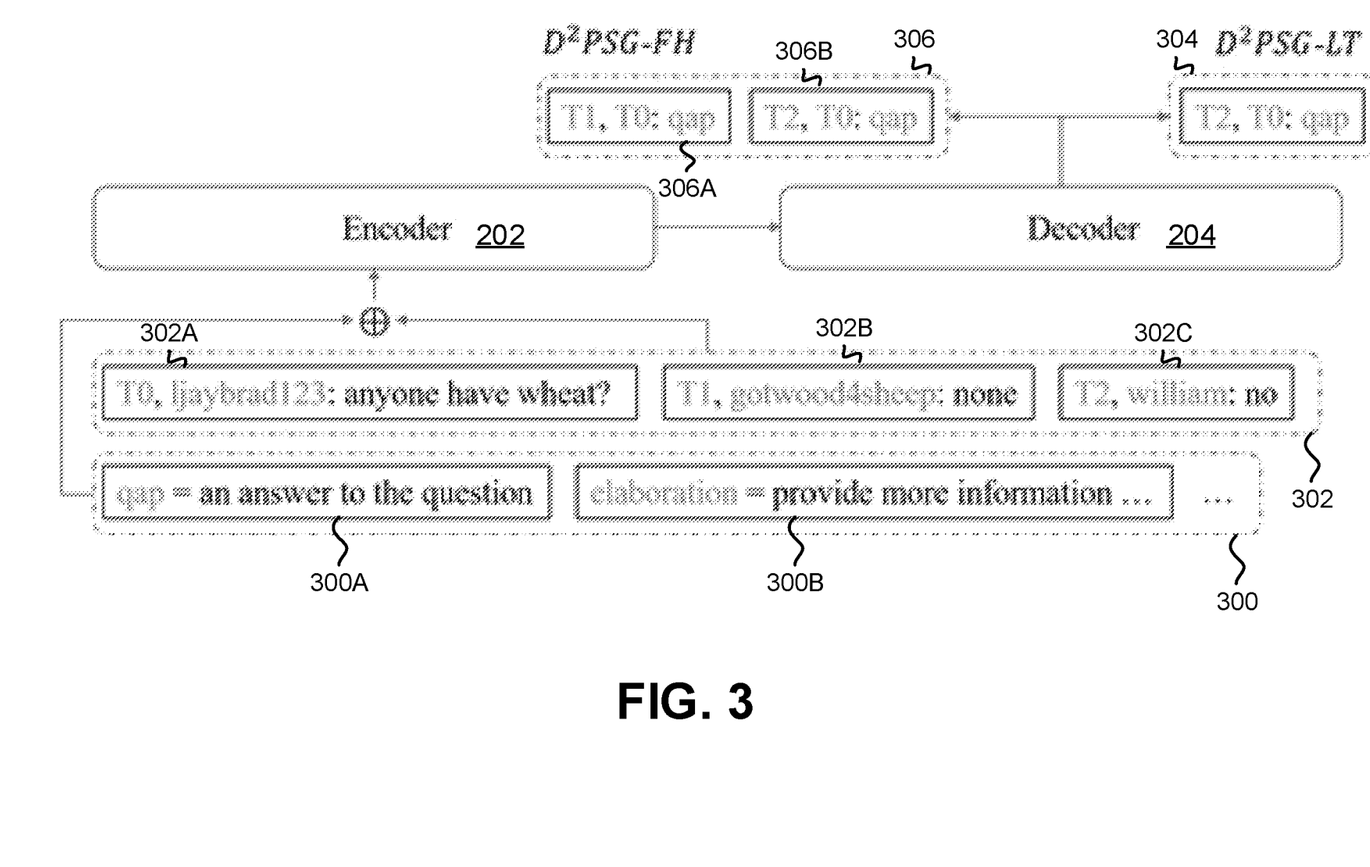
FIG. 3 is another block diagram of the dialogue discourse parsing as a sequence generation system, in accordance with various embodiments of the present disclosure.

As illustrated in FIG. 3, in some embodiments, the $D^2PSG$ system receives a dialogue history and directly generates the dependency discourse relations. The $D^2PSG$ system may rely on sequence identifiers (e.g., turn markers) and utilize multiple prediction strategies to formulate the task of discourse relation determination as a sequence generation problem. For example, as illustrated in FIG. 3, a dialogue history may include utterances 302 that include a series of utterances 302A, 302B, and 302C. FIG. 3 further illustrates discourse relation types 300 such as a question answer pair 300A and a question elaboration 300B. The decoder 204 may produce discourse relation triple 304 according to a $D^2PSG$-LT operation (described in further detail below), and discourse relation triples 306 including discourse relation triples 306A and 306B. The discourse relation triples 306 may be generated based on a $D^2PSG$-FH operation (described in further detail below). The generated discourse relation triples may be used to generate one or more query words corresponding to the dialogue.

In some embodiments, the $D^2PSG$-LT strategy focuses on the relations associated with the latest dialogue utterance. For input $x_1, \ldots, x_i$, the $D^2PSG$-LT strategy may ask the $D^2PSG$ system to predict one relation triple $(T_i, T_j : r_{i,j})$, where $j<i$. For example, in FIG. 3, only "T2, T0: qap" is predicted based on the $D^2PSG$-LT strategy.

In some embodiments, the $D^2PSG$-FH strategy may predict all discourse relations from each input $x_1, \ldots x_i$. For example, in FIG. 3, all relations, i.e. (T1, T0: qap) and (T2, T0: qap), are concatenated as the target sequence for prediction. Compared with $D^2PSG$-LT, $D^2PSG$-FH may benefit from the partial predicted discourse relations.

In some embodiments, a T5 model for sequence generation is used. The T5 model has strong generality, making the model suitable for sequence generation. Similar to Classifier-Hier and Classifier-Concat, the T5 encoder may be adopted first to encode the dialogue history. Next, the T5 decoder may be used on the output of the $T_5$ encoder to perform discourse parsing by generating each linearized discourse relation triples in an autoregressive manner:

$$P(Y_i) = T5Dec(T5Enc(X), Y_{<i}), \qquad \text{Eq. (1)}$$

where X indicates the current dialogue context, and Y represents the target token sequence of linearized discourse-relation triples.

In some embodiments, the model is fine-tuned with a standard cross-entropy loss:

$$L = -\sum_{i=1}^{|Y|} \log P(Y_i). \qquad \text{Eq. (2)}$$

Since the T5 encoder and T5 decoder may have been jointly pre-trained with large-scale self-supervised signals, the parameters of the encoder and decoder may be well initialized, and the decoder may exploit the rich features from the encoder via a cross attention mechanism. Therefore, the embodiments of the present disclosure may quickly adapt to the dialogue discourse parsing task with limited training data. In some embodiments, constraint decoding may be applied to ensure that the $D^2PSG$ system generates legal sequences under predetermined policies. Particularly, each complete triple $(T_i, T_j : r_{i,j})$ where $j<i$ and $r_{i,j}$, may be required to be a discourse relation. As another example, under $D^2PSG$-LT, it may be required to produce one complete triple with $T_i$ being the marker of the latest utterance. Under $D^2PSG$-FH, it may be required to produce the same number of triples as the number of dialogue utterances, and for each triple $(T_i, T_j : r_{i,j})$, $T_i$ is the marker of the corresponding utterance.

Figure 4:
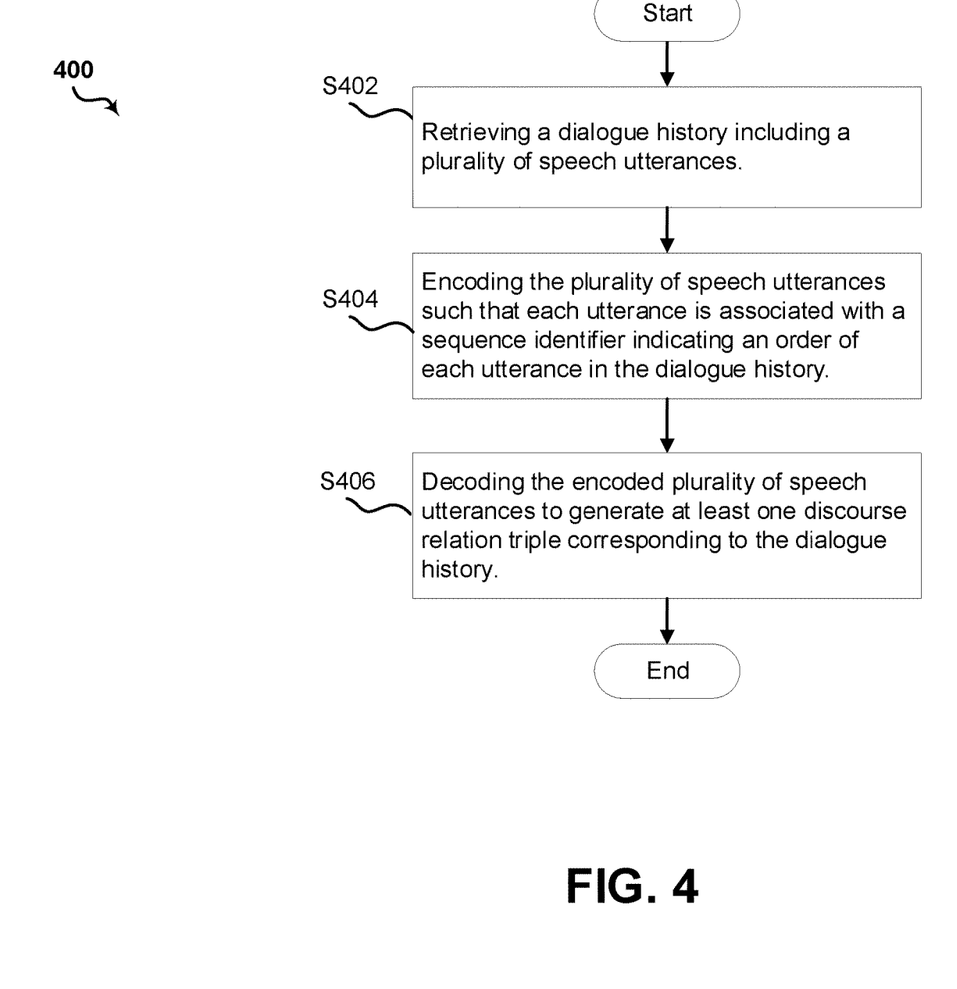
FIG. 4 is a flow chart of an example process for performing a dialogue discourse parsing sequence generation process, in accordance with various embodiments of the present disclosure.

FIG. 4 is a flow chart of an embodiment of a process 400 for performing a $D^2PSG$ process 400. Process 400 may generally start at operation S402 where a dialogue history including a plurality of speech utterances is retrieved. For example, the dialogue history may correspond to the dialogue history of FIG. 1.

The process may proceed to operation S404 where the plurality of speech utterances are encoded such that each utterance is associated with a sequence identifier (e.g., turn marker) indicating an order of each utterance in the dialogue history. For example, a dialogue history having speech utterances X1,X2,X3, and X4 may be encoded as follows: T1,X1; T2,X2,T3,X3; T4,X4.

The process proceeds to operation S406 where the encoded plurality of speech utterances is decoded to generate at least one discourse relation triple corresponding to the dialogue history. For example, the $D^2PSG$-LT operation or the $D^2PSG$-FH operation may be performed on the encoded plurality of speech utterances. The process 400 may end after operation S406.

Figure 5:
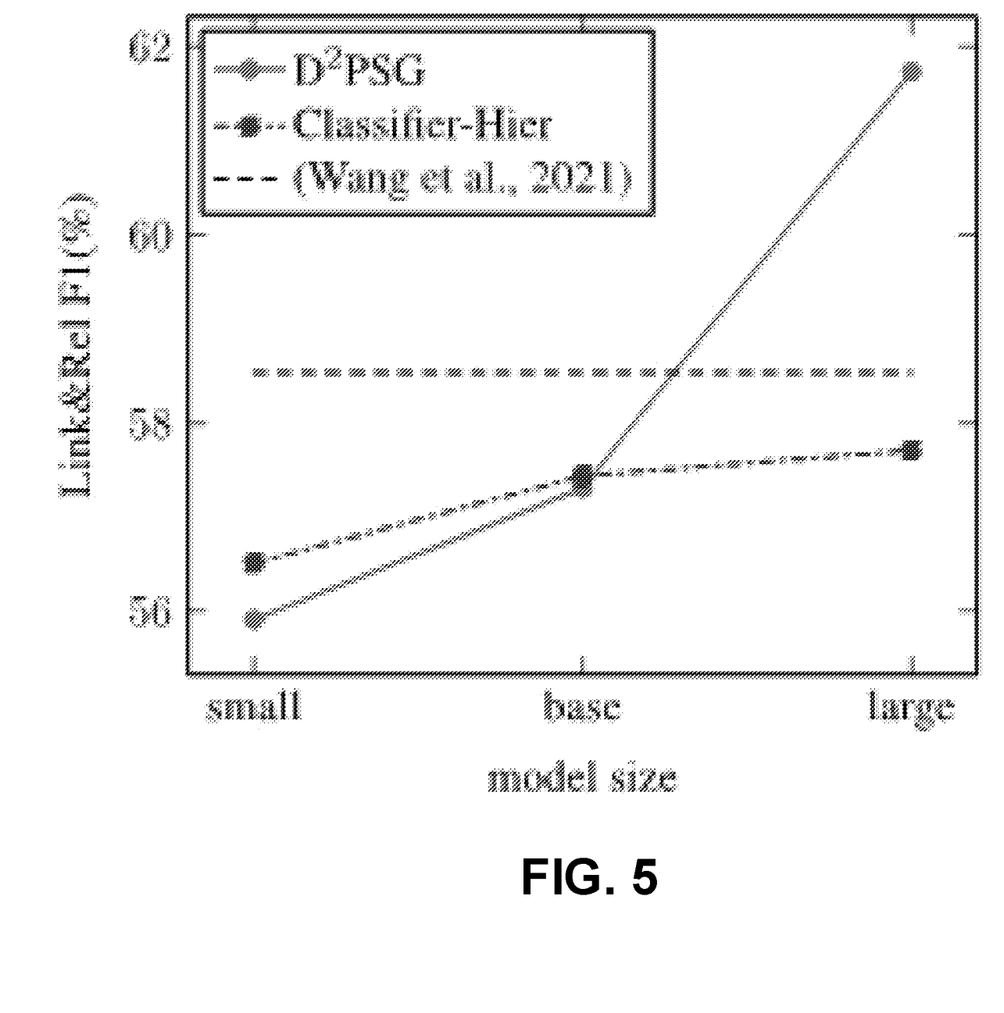
FIG. 5 illustrates a performance chart, in accordance with various embodiments of the present disclosure.

The embodiments of the present disclosure are significantly advantageous over previous methods. Particularly, the performance gain by enlarging the size of the pre-trained LM is very marginal. As shown in FIG. 5, though T5-large is 10-times larger than T5-small, where the large data increase only gives an increase of 1.2 F1 points on the Molweni benchmark. The reason for this marginal gain is that the utterance-level encoder and the classifiers are still trained from scratch, and thus, cannot fully exploit the rich features from the pre-trained sentence encoder by being trained only on limited benchmark data. As such, the prior methods suffer from requiring large amounts of data (e.g., the data hunger issue). As illustrated in FIG. 5, the $D^2PSG$ system significantly outperforms the prior methods.

Figure 6:
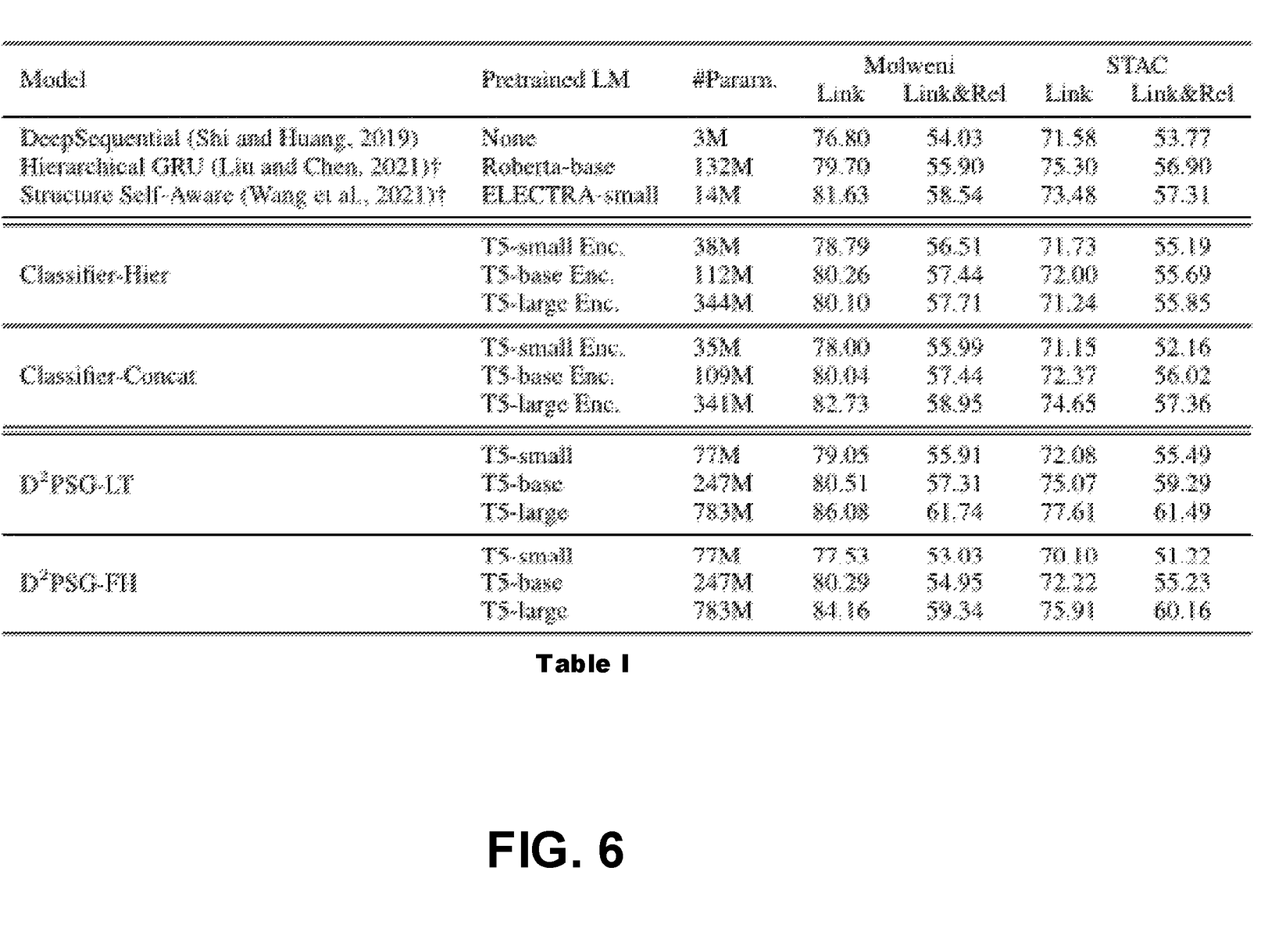
FIG. 6 illustrates a table providing test results, in accordance with various embodiments of the present disclosure.

Experiments were conducted on two benchmark datasets: (i) Molweni, which is a multi-party dialogue corpus manually annotated based on the Ubuntu Chat Corpus, which contains 9,000, 500 and 500 dialogues for training, development and testing, respectively; and (ii) Strategic Conversation (STAC) corpus. The dataset for the STAC corpus was collected from an online game, and is much smaller than Molweni containing 1,062 and 111 dialogues for training and testing, respectively. Following previous work, as illustrated in Table I in FIG. 6, the $D^2PSG$ system and baselines were evaluated with two scores: (i) Link F1, which only measures whether the discourse link is correctly predicted; and (ii) Link&Rel F1, which is the main metric, measuring whether both the discourse link and the relation type are correctly predicted at the same time. Here, F1 denotes a micro-averaged F1 score. With the T5-large model, both $D^2PSG$-FH and $D^2PSG$-LT outperform previous state of the art (SOTA) systems and the baselines on the two benchmarks, showing the significant advantages of the embodiments of the present disclosure.

Figure 7:
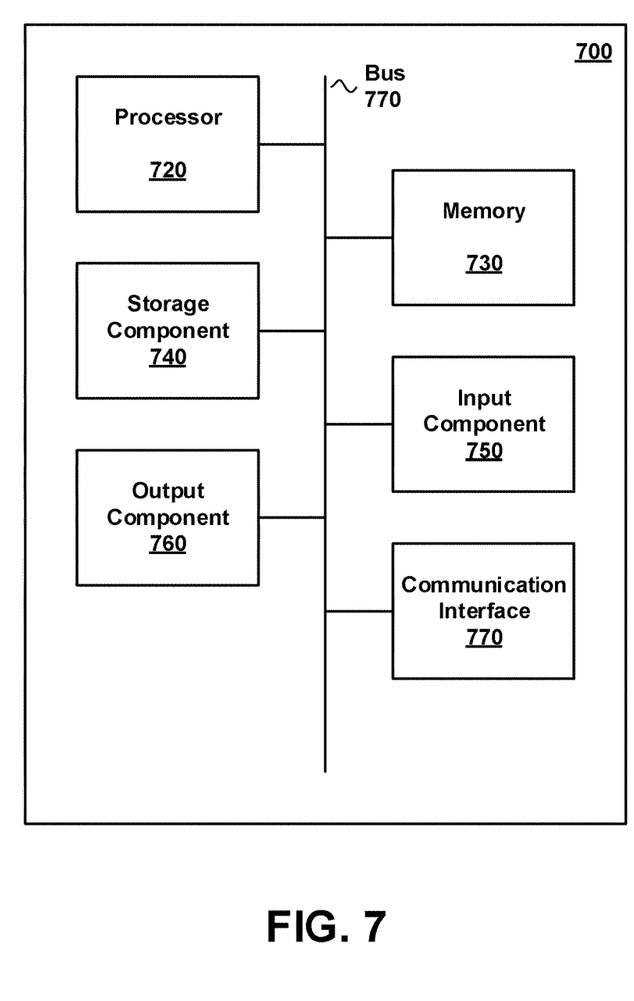
FIG. 7 illustrates an example device, in accordance with various embodiments of the present disclosure.

FIG. 7 is diagram of an example device for performing translation services. Device 700 may correspond to any type of known computer, server, or data processing device. For example, the device 700 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, or any other similar operating device.

In some embodiments, as shown in FIG. 7, the device 700 may include a set of components, such as a processor 720, a memory 730, a storage component 740, an input component 750, an output component 760, and a communication interface 770.

The bus 710 may comprise one or more components that permit communication among the set of components of the device 700. For example, the bus 710 may be a communication bus, a cross-over bar, a network, or the like. Although the bus 710 is depicted as a single line in FIG. 7, the bus 710 may be implemented using multiple (two or more) connections between the set of components of device 700. The disclosure is not limited in this regard.

The device 700 may comprise one or more processors, such as the processor 720. The processor 720 may be implemented in hardware, firmware, and/or a combination of hardware and software. For example, the processor 720 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the operations described herein. A general purpose processor may be a microprocessor, or any conventional processor, controller, microcontroller, or state machine. The processor 720 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given operation.

The processor 720 may control overall operation of the device 700 and/or of the set of components of device 700 (e.g., the memory 730, the storage component 740, the input component 750, the output component 760, the communication interface 770).

The device 700 may further comprise the memory 730. In some embodiments, the memory 730 may comprise a random access memory (RAM), a read only memory (ROM), an electrically erasable programmable ROM (EEPROM), a flash memory, a magnetic memory, an optical memory, and/or another type of dynamic or static storage device. The memory 730 may store information and/or instructions for use (e.g., execution) by the processor 720.

The storage component 740 of device 700 may store information and/or computer-readable instructions and/or code related to the operation and use of the device 700. For example, the storage component 740 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 700 may further comprise the input component 750. The input component 750 may include one or more components that permit the device 700 to receive information, such as via user input (e.g., a touch screen, a keyboard, a keypad, a mouse, a stylus, a button, a switch, a microphone, a camera, and the like). Alternatively or additionally, the input component 750 may include a sensor for sensing information (e.g., a global positioning system (GPS) component, an accelerometer, a gyroscope, an actuator, and the like).

The output component 760 of device 700 may include one or more components that may provide output information from the device 700 (e.g., a display, a liquid crystal display (LCD), light-emitting diodes (LEDs), organic light emitting diodes (OLEDs), a haptic feedback device, a speaker, and the like).

The device 700 may further comprise the communication interface 770. The communication interface 770 may include a receiver component, a transmitter component, and/or a transceiver component. The communication interface 770 may enable the device 700 to establish connections and/or transfer communications with other devices (e.g., a server, another device). The communications may be effected via a wired connection, a wireless connection, or a combination of wired and wireless connections. The communication interface 770 may permit the device 700 to receive information from another device and/or provide information to another device. In some embodiments, the communication interface 770 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 770 may provide for communications with another device via a device-to-device (D²D) communication link, such as FlashLinQ, WiMedia, Bluetooth, ZigBee, Wi-Fi, LTE, 5G, and the like. In other embodiments, the communication interface 770 may include an Ethernet interface, an optical interface, a coaxial interface, an infrared interface, a radio frequency (RF) interface, or the like.

The device 700 may be included in the core network 240 and perform one or more processes described herein. The device 700 may perform operations based on the processor 720 executing computer-readable instructions and/or code that may be stored by a non-transitory computer-readable medium, such as the memory 730 and/or the storage component 740. A computer-readable medium may refer to a non-transitory memory device. A memory device may include memory space within a single physical storage device and/or memory space spread across multiple physical storage devices.

Computer-readable instructions and/or code may be read into the memory 730 and/or the storage component 740 from another computer-readable medium or from another device via the communication interface 770. The computer-readable instructions and/or code stored in the memory 730 and/or storage component 740, if or when executed by the processor 720, may cause the device 700 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more operations described as being performed by another set of components shown in FIG. 7.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the operations specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical operation(s). The method, computer system, and computer readable medium may include additional blocks, fewer blocks, different blocks, or differently arranged blocks than those depicted in the Figures. In some alternative implementations, the operations noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified operations or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A method performed by at least one processor, the method including: retrieving a dialogue history including a plurality of speech utterances, each speech utterance including one or more words; encoding the plurality of speech utterances such that each speech utterance is associated with a sequence identifier indicating an order of each speech utterance in the dialogue history; and decoding the encoded plurality of speech utterances to generate at least one discourse relation triple corresponding to the dialogue history, the at least one discourse relation triple including a first sequence identifier of a first speech utterance from the plurality of speech utterances, a second sequence identifier of a second speech utterance from the plurality of speech utterances, and a dialogue discourse type.

(2) The method of feature (1), in which the second speech utterance occurs after the first speech utterance such that the second speech utterance is a response to the first speech utterance.

(3) The method of feature (2), in which the decoding the encoded plurality of speech utterances is performed such that the second speech utterance is the last speech utterance in the dialogue history.

(4) The method according to any one of features (1)-(3), in which the decoding the encoded plurality of speech utterances is performed such that a discourse relation triple is generated for each speech utterance included in the plurality of speech utterances.

(5) The method according to any one features (1)-(4), further including: calculating a loss operation that compares a current dialogue context with a target token sequence; and training the encoder and the decoder based on the calculated loss operation.

(6) The method according to any one of features (1)-(5) The method of feature 1, in which the discourse type is selected from one of a question answer pair, a question elaboration, and an acknowledgement.

(7) The method according to any one of features (1)-(6), in which the encoder is a T5 encoder and the decoder is a T5 decoder.

(8) The method according to any one of features (1)-(7), in which the dialogue history includes at least three or more speakers.

(9) An apparatus including: at least one memory configured to store computer program code; and at least one processor configured to access said at least one memory and operate as instructed by said computer program code, said computer program code including: retrieving code configured to cause the at least one processor to retrieve a dialogue history including a plurality of speech utterances, each speech utterance including one or more words, encoding code configured to cause the at least one processor to encode the plurality of speech utterances such that each speech utterance is associated with a sequence identifier indicating an order of each speech utterance in the dialogue history, and decoding code configured to cause the at least one processor to decode the encoded plurality of speech utterances to generate at least one discourse relation triple corresponding to the dialogue history, the at least one discourse relation triple including a first sequence identifier of a first speech utterance from the plurality of speech utterances, a second sequence identifier of a second speech utterance from the plurality of speech utterances, and a dialogue discourse type.

(10) The apparatus of feature (9), in which the second speech utterance occurs after the first speech utterance such that the second speech utterance is a response to the first speech utterance.

(11) The apparatus of feature (10), in which the decoding code is further configured to cause the at least one processor to decode the encoded plurality of speech utterances such that the second speech utterance is the last speech utterance in the dialogue history.

(12) The apparatus according to any one of features (9)-(11), in which the decoding code is further configured to cause the at least one processor to decode the encoded plurality of speech utterances such that a discourse relation triple is generated for each speech utterance included in the plurality of speech utterances.

(13) The apparatus according to any one of features (9)-(12), in which said computer program code further includes: calculating code configured to cause the at least one processor to calculate a loss operation that compares a current dialogue context with a target token sequence; and training code configured to cause the at least one processor to train the encoder and the decoder based on the calculated loss operation.

(14) The apparatus according to any one of features (9)-(13), in which the discourse type is selected from one of a question answer pair, a question elaboration, and an acknowledgement.

(15) The apparatus according to any one of features (9)-(14), in which the encoder is a T5 encoder and the decoder is a T5 decoder.

(16) The apparatus according to any one of features (9)-(15), in which the dialogue history includes at least three or more speakers.

(17) A non-transitory computer readable medium having instructions stored therein, which when executed a processor cause the processor to execute a method including: retrieving a dialogue history including a plurality of speech utterances, each speech utterance including one or more words; encoding the plurality of speech utterances such that each speech utterance is associated with a sequence identifier indicating an order of each speech utterance in the dialogue history; and decoding the encoded plurality of speech utterances to generate at least one discourse relation triple corresponding to the dialogue history, the at least one discourse relation triple including a first sequence identifier of a first speech utterance from the plurality of speech utterances, a second sequence identifier of a second speech utterance from the plurality of speech utterances, and a dialogue discourse type.

(18) The non-transitory computer readable medium of feature 17, in which the second speech utterance occurs after the first speech utterance such that the second speech utterance is a response to the first speech utterance.

(19) The non-transitory computer readable medium of feature (18), in which the decoding the encoded plurality of speech utterances is performed such that the second speech utterance is the last speech utterance in the dialogue history.

(20) The non-transitory computer readable medium according to any one of features (17)-(19), in which the decoding the encoded plurality of speech utterances is performed such that a discourse relation triple is generated for each speech utterance included in the plurality of speech utterances.

What is claimed is:

1. A method performed by at least one processor, the method comprising:
    retrieving a dialogue history including a plurality of speech utterances, each speech utterance including one or more words;
    encoding the plurality of speech utterances such that each speech utterance is associated with a sequence identifier indicating an order of each speech utterance in the dialogue history; and
    decoding the encoded plurality of speech utterances to generate at least one discourse relation triple corresponding to the dialogue history, the at least one discourse relation triple including a first sequence identifier of a first speech utterance from the plurality of speech utterances, a second sequence identifier of a second speech utterance from the plurality of speech utterances, and a dialogue discourse type.

2. The method of claim 1, wherein the second speech utterance occurs after the first speech utterance such that the second speech utterance is a response to the first speech utterance.

3. The method of claim 2, wherein the decoding the encoded plurality of speech utterances is performed such that the second speech utterance is the last speech utterance in the dialogue history.

4. The method of claim 1, wherein the decoding the encoded plurality of speech utterances is performed such that a discourse relation triple is generated for each speech utterance included in the plurality of speech utterances.

5. The method of claim 1, further comprising:
    calculating a loss operation that compares a current dialogue context with a target token sequence; and
    training the encoder and the decoder based on the calculated loss operation.

6. The method of claim 1, wherein the discourse type is selected from one of a question answer pair, a question elaboration, and an acknowledgement.

7. The method of claim 1, wherein the encoder is a T5 encoder and the decoder is a T5 decoder.

8. The method of claim 1, wherein the dialogue history includes at least three or more speakers.

9. An apparatus comprising:
    at least one memory configured to store computer program code; and
    at least one processor configured to access said at least one memory and operate as instructed by said computer program code, said computer program code including:
        retrieving code configured to cause the at least one processor to retrieve a dialogue history including a plurality of speech utterances, each speech utterance including one or more words,
        encoding code configured to cause the at least one processor to encode the plurality of speech utterances such that each speech utterance is associated with a sequence identifier indicating an order of each speech utterance in the dialogue history, and
        decoding code configured to cause the at least one processor to decode the encoded plurality of speech utterances to generate at least one discourse relation triple corresponding to the dialogue history, the at least one discourse relation triple including a first sequence identifier of a first speech utterance from the plurality of speech utterances, a second sequence identifier of a second speech utterance from the plurality of speech utterances, and a dialogue discourse type.

10. The apparatus of claim 9, wherein the second speech utterance occurs after the first speech utterance such that the second speech utterance is a response to the first speech utterance.

11. The apparatus of claim 10, wherein the decoding code is further configured to cause the at least one processor to decode the encoded plurality of speech utterances such that the second speech utterance is the last speech utterance in the dialogue history.

12. The apparatus of claim 9, wherein the decoding code is further configured to cause the at least one processor to decode the encoded plurality of speech utterances such that a discourse relation triple is generated for each speech utterance included in the plurality of speech utterances.

13. The apparatus of claim 9, wherein said computer program code further includes:
    calculating code configured to cause the at least one processor to calculate a loss operation that compares a current dialogue context with a target token sequence; and
    training code configured to cause the at least one processor to train the encoder and the decoder based on the calculated loss operation.

14. The apparatus of claim 9, wherein the discourse type is selected from one of a question answer pair, a question elaboration, and an acknowledgement.

15. The apparatus of claim 9, wherein the encoder is a T5 encoder and the decoder is a T5 decoder.

16. The apparatus of claim 9, wherein the dialogue history includes at least three or more speakers.

17. A non-transitory computer readable medium having instructions stored therein, which when executed a processor cause the processor to execute a method comprising:
    retrieving a dialogue history including a plurality of speech utterances, each speech utterance including one or more words;
    encoding the plurality of speech utterances such that each speech utterance is associated with a sequence identifier indicating an order of each speech utterance in the dialogue history; and
    decoding the encoded plurality of speech utterances to generate at least one discourse relation triple corresponding to the dialogue history, the at least one discourse relation triple including a first sequence identifier of a first speech utterance from the plurality of speech utterances, a second sequence identifier of a second speech utterance from the plurality of speech utterances, and a dialogue discourse type.

18. The non-transitory computer readable medium of claim 17, wherein the second speech utterance occurs after the first speech utterance such that the second speech utterance is a response to the first speech utterance.

19. The non-transitory computer readable medium of claim 18, wherein the decoding the encoded plurality of speech utterances is performed such that the second speech utterance is the last speech utterance in the dialogue history.

20. The non-transitory computer readable medium of claim 17, wherein the decoding the encoded plurality of speech utterances is performed such that a discourse relation triple is generated for each speech utterance included in the plurality of speech utterances.

* * * * *